United States Patent [19]
David

[11] Patent Number: 4,629,629
[45] Date of Patent: Dec. 16, 1986

[54] METHOD FOR PROCESSING AVOCADOS

[76] Inventor: Constant V. David, 4952 Field St., San Diego, Calif. 92110

[21] Appl. No.: 772,161

[22] Filed: Sep. 3, 1985

[51] Int. Cl.$^4$ ............................................. A23L 1/212
[52] U.S. Cl. ..................................... 426/482; 99/537; 426/484
[58] Field of Search ...................... 426/484, 485, 482; 99/537, 514, 547, 584, 594, 596

[56] References Cited

U.S. PATENT DOCUMENTS 2,954,063 9/1960 Wilbur ................................... 99/584
4,054,675 10/1977 Spence ................................. 426/485

Primary Examiner—George Yeung

[57] ABSTRACT

A method and an apparatus for processing ripe avocados in which the pulp is separated from the outer skin and from the seed in sequenced operations. The pulp can then be reduced to a paste-like product and frozen for easy preservation, handling and marketing. The avocado pulp does not acquire its consistency and reach its oil content until the fruit has ripened to a stage where the pulp is soft. At this stage, a few days are available to process the avocado before it spoils. The ripening process occurs naturally after the fruit has been picked off the tree, providing it is left undisturbed with the seed and the skin untouched. Otherwise, no ripening takes place. Because the external surface of a ripe avocado is so soft and because its seed is so hard, the extraction of the edible and tasty pulp is difficult to perform with automatically operating machinery. Such machinery and the attendant method are the subject of the present disclosure. The ripe avocado is firmly held by means of its seed while the skin and the pulp are removed automatically.

27 Claims, 37 Drawing Figures

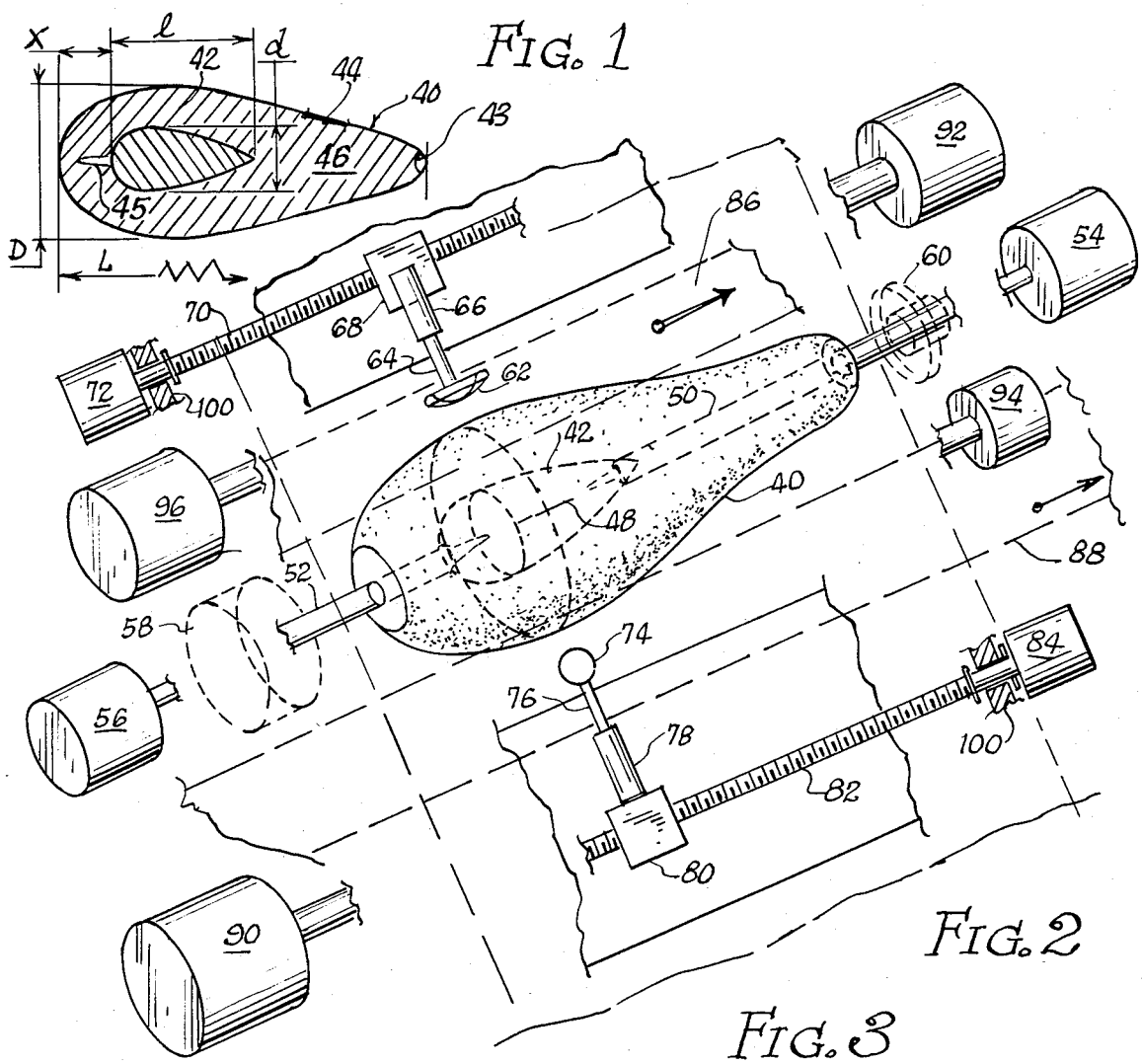
Fig. 1
Fig. 2
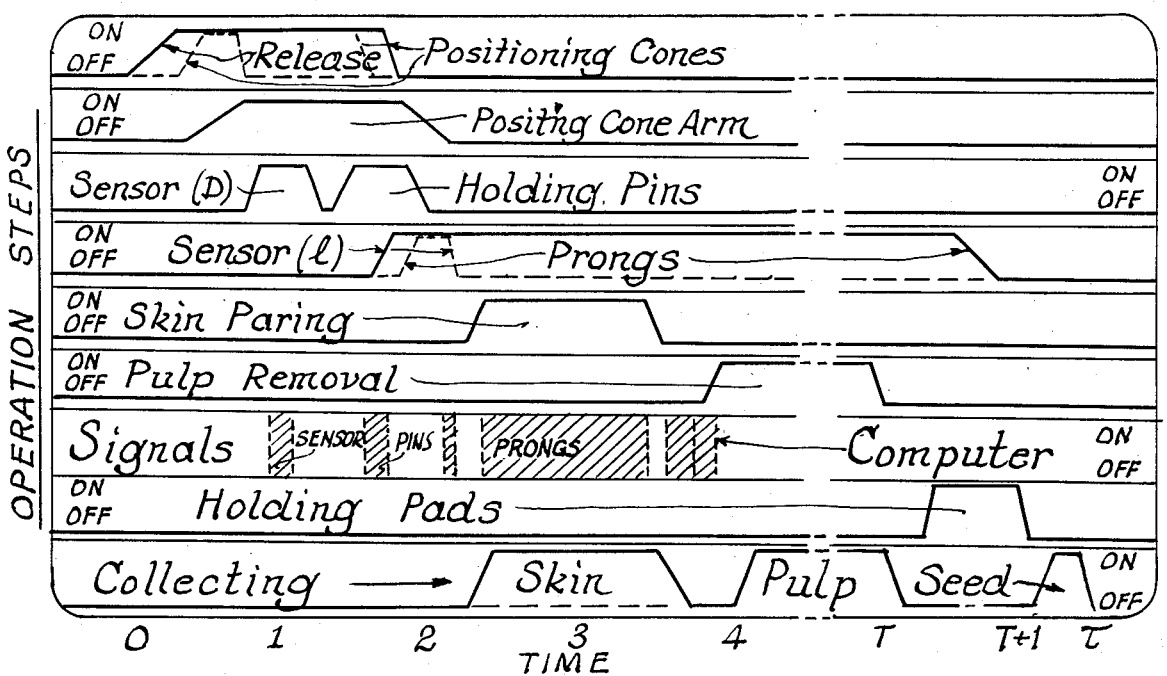
Fig. 3

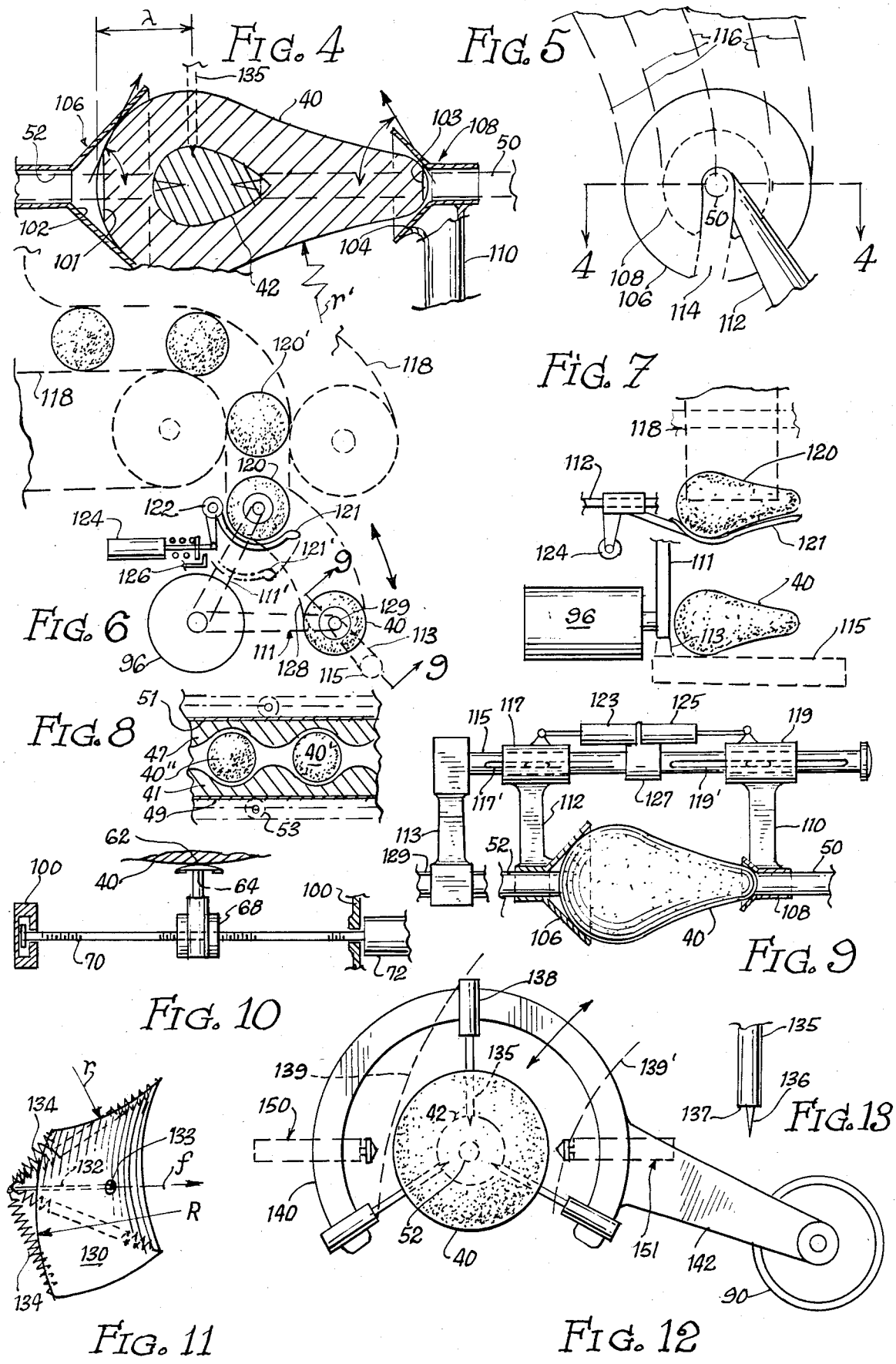

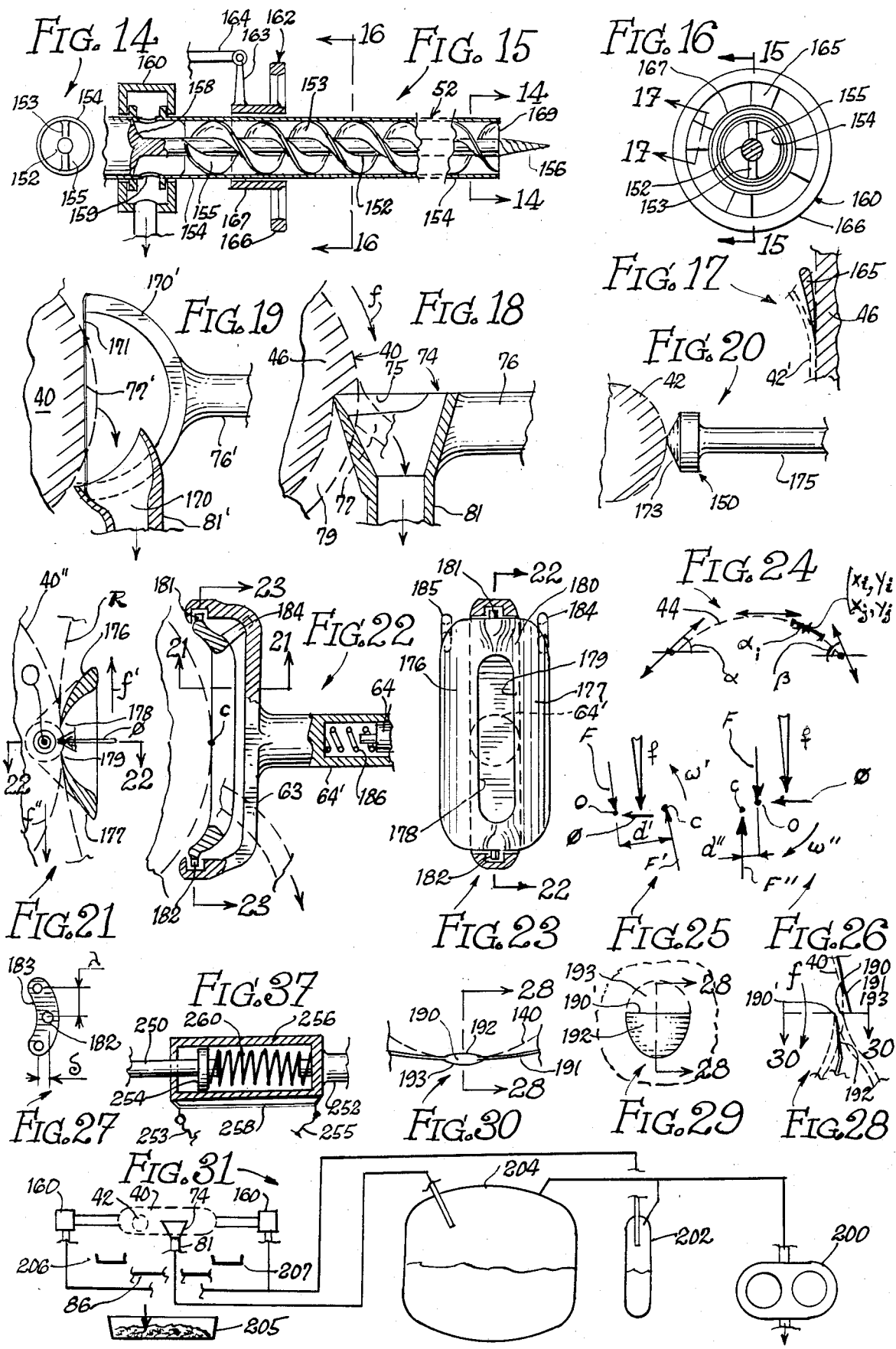

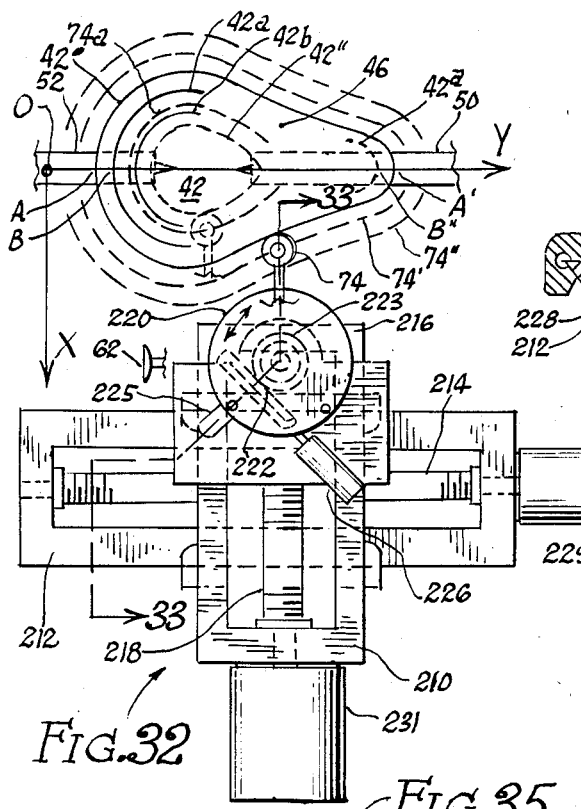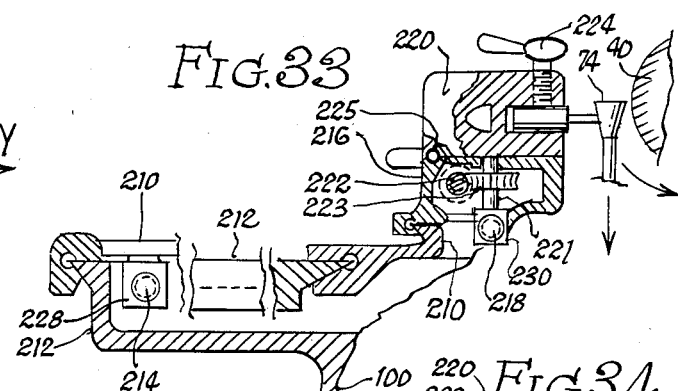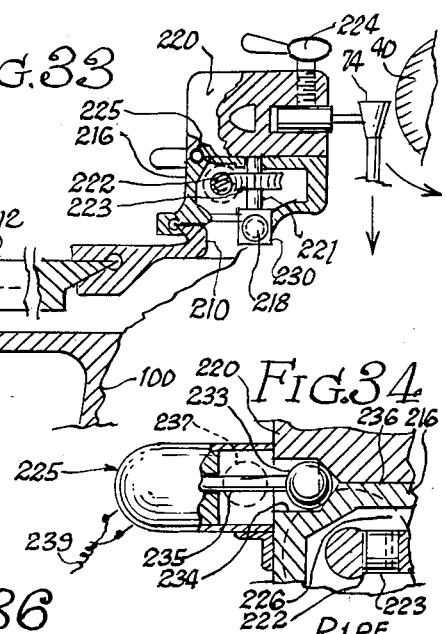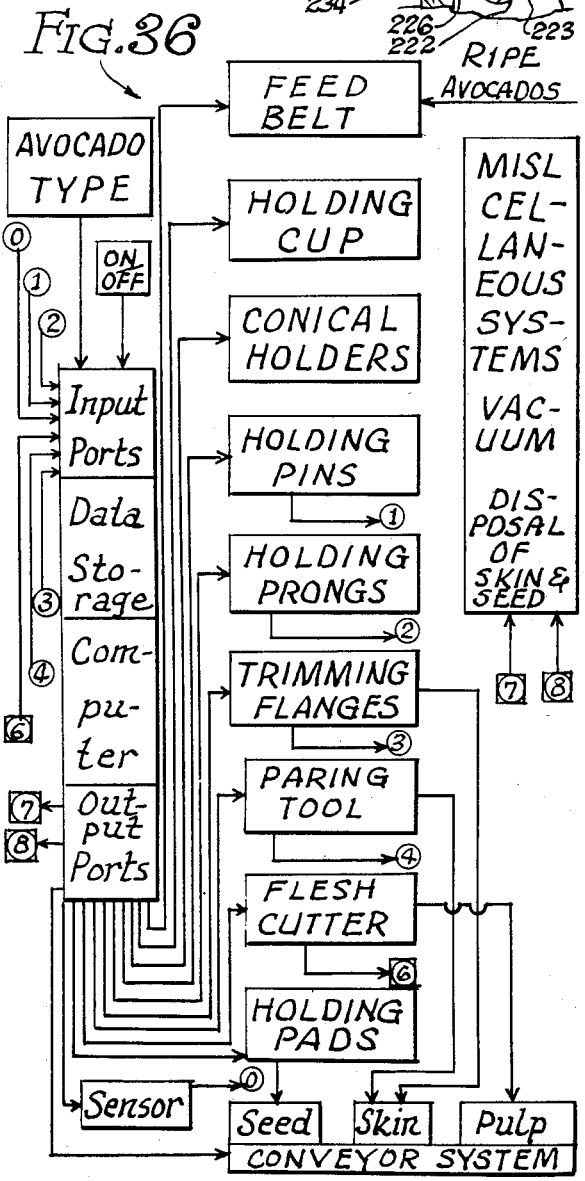

METHOD FOR PROCESSING AVOCADOS

BACKGROUND OF THE INVENTION

The present invention relates to an apparatus for separating the pulp of a ripe avocado from the skin and the seed automatically and the method thereof. The handling of a ripe avocado by parts and components of automatically operating equipments is very difficult because the fruit is externally very soft, but contains a centrally-located large and hard seed. Both methods and machineries commonly used for processing other fruits such as pears and drupes are unsuitable for ripe avocado processing. The pulp supporting the skin is much too soft and the seed is much too large and hard. Even when the skin is removed, the external surface of the pulp is then much too slippery for practical handling by means other than human hands.

The nature of the avocado fruit is such that the pulp is edible and tasty only when the fruit has reached the degree of ripening which gives the pulp its oil content and attendant consistency. Also, the ripening process cannot take place unless the avocado is picked from the tree still hard, with a minimum content of fatty materials, high enough to insure the maturing completion, but low enough to insure that the proper ripening is going to occur by means of chemicals generated by the seed after the fruit is separated from the tree. The natural ripening process can be slowed down by keeping the fruit at low temperatures above freezing. When the fruit is left at room temperature, either after being picked or taken out of cold storage, it will generally ripen after a few days, if it already contains a percentage of fatty materials. The minimum of such percentage is actually fixed by law. If this minimum percentage is not reached before the fruit is picked, the completion of the maturing does not take place. The fruit shrivels, remains hard and is useless. Therefore, unless the pulp is extracted at the right stage of ripening, it has no commercial value. This degree of ripening lasts only for a few days. Henceforth, the fruit spoils quickly.

In any event, the manual extraction of the pulp of a ripe avocado is often messy and frustrating, unless done expertly. The marketing of avocados on a large commercial scale has been rendered difficult because of the handling problems inherent to the ripening process. However, many culinary applications need only avocado pulp paste as main ingredient, such as the well-known guacamole. The pasty pulp, once extracted from the fruit, can be frozen for shipping and storage. Seasoning can be added before the freezing step or after thawing, prior to preparing the dish. To render the raw avocado paste inexpensive, the extraction of the pulp from the ripe fruits must be made automatic and reliable by machine. The goals of the present invention are to provide an apparatus and a method which offer such possibilities, by minimizing the need for manual labor.

SUMMARY OF THE INVENTION

It is therefore a primary object of the present invention to provide an apparatus and a method which can be used to separate the pulp of a ripe avocado from its skin and seed.

It is another object of the present invention to provide an apparatus and a method which process the ripe avocados automatically and reliably, with a minimum amount of needed supervision.

It is still another object of the present invention to provide an apparatus and a method which assure the separate evacuation of the pulp, the seeds and the skin, upon removing, in a manner such that the pulp contains no extraneous materials.

It is still another object of the present invention to provide an apparatus and a method which permit the handling of avocados of various kinds, shapes and sizes.

Accordingly, the present invention provides an apparatus and a method for processing avocados in a manner which is easy and simple, requires a minimum of labor and provides ripe avocado pulp inexpensively and on a mass production basis.

DESCRIPTION OF THE DRAWINGS

FIG. 1 is a longitudinal sectional view of a typical avocado fruit showing its basic constituents and proportions.

FIG. 2 is a perspective schematic view of the major components, and of their actuation, of a preferred embodiment of the machinery used as example in the present invention.

FIG. 3 is a time diagram showing the sequence of the various operations required to extract the pulp of an avocado.

FIG. 4 is a longitudinal sectional view of an avocado when held by positionong and centering conical surfaces, taken along section line 4—4 of FIG. 5.

FIG. 5 is an end view of the conical surfaces.

FIG. 6 is a schematic view of the machinery used to transfer an avocado from a feeding station to the processing station.

FIG. 7 is a side view of the schematic shown in FIG. 6.

FIG. 8 is a detail transversal sectional view of the conveyor system bringing the avocados to the feeding station.

FIG. 9 is a plan view of the mechanism which transfers the avocados from the feeding station to the processing station.

FIG. 10 is a schematic top view of the actuating mechanism of the paring tool.

FIG. 11 is a perspective schematic diagram of the shape required of the paring tool and of the avocado shape sensor.

FIG. 12 is schematic side view of the mechanism needed to support and position the holding pins and the holding pads.

FIG. 13 is a partial view of the end of a holding pin.

FIG. 14 is a transversal sectional view of a holding prong taken along section line 14—14 of FIG. 15.

FIG. 15 is a longitudinal sectional view of one of the two holding prongs taken along section line 15—15 of FIG. 16.

FIG. 16 is a transversal sectional view of the prong taken along section line 16—16 of FIG. 15 showing a trimming flange.

FIG. 17 is a partial sectional view of a typical cutting edge of either the trimming flange or of one of two walls located between the two spiral flutes located inside the prong taken along section line 17—17 of FIG. 16.

FIG. 18 is an elevation sectional view of one embodiment of the flesh cutter.

FIG. 19 is an elevation sectional view of another embodiment of the flesh cutter.

FIG. 20 is an elevation view of the end of a holding pad.

FIG. 21 is a plan sectional view of one embodiment of a paring tool taken along section line 21—21 of FIG. 22.

FIG. 22 is an elevation sectional view of a paring tool taken along section line 22—22 of FIG. 21.

FIG. 23 is an end view and partial sectional view of a paring tool taken along section line 23—23 of FIG. 22.

FIG. 24 is a diagram showing various positions that the paring tool of FIG. 21 assumes as it moves along the avocado.

FIG. 25 is a diagram showing the relative positions of the articulation of the paring tool and of its cutting edges needed to render its operation automatically stable.

FIG. 26 is a diagram showing a case where the relative positions are such that an unstable operation would result.

FIG. 27 is a diagram showing a way one end of the paring tool can be articulated to facilitate its operation.

FIG. 28 is a partial transversal sectional view of another embodiment of the paring tool taken along section lines 28—28 of FIGS. 29 and 30.

FIG. 29 is a partial elevation view of the paring tool.

FIG. 30 is a plan sectional view of the paring tool taken along section line 30—30 of FIG. 28.

FIG. 31 is a schematic diagram of the evacuation system used for collecting the pulp and the end trimmings cut by the prongs and the trimming flanges.

FIG. 32 is a schematic diagram of an arrangement of paring tool and flesh cutter mounted on a rotating turret and of their actuating mechanisms.

FIG. 33 is a developed partial elevation sectional view of the mechanism of FIG. 32 taken along broken section line 33—33 of FIG. 32.

FIG. 34 is a partial elevation sectional view of the locking mechanism of the turret.

FIG. 35 is a table itemizing various method steps performed by the various components of the preferred embodiment during a full avocado processing cycle.

FIG. 36 is a block diagram of a preferred embodiment of the control system required for sequencing and synchronizing the various operational steps expected of and followed by the machinery components during one full processing cycle.

FIG. 37 is a longitudinal sectional view of a coupling mechanism for detecting transversal movement of a tool holding stem.

DETAILED DESCRIPTION OF THE INVENTION

Referring to FIG. 1, a typical stemmed ripe avocado 40 is shown consisting of a seed 42, an indentation 43 left by the removed stem, a skin 44, a starting root system 45 emerging from the axis of seed 42 and pulp 46. Such avocado is geometrically defined by the following dimensions: its length L, its diameter D, its seed length l and diameter d and the location of the seed determined by dimension X. The shape of the avocado is assumed to be of revolution and similar for all avocados of the same kind, generally characterized by the ratio L/D. The extent of the root system is dependent upon the time during maturing when the avocado was picked off the tree. When the avocados are timely picked, the emerging root system is small and is removed by one prong as later discussed. Such emerging root can be ignored at this time.

FIG. 2 shows a typical schematic arrangement of the preferred embodiment of the present invention. Avocado 40 is held along its centerline or axis of symmetry 48 by two prongs 50 and 52. These prongs are driven by two separate electrical motors 54 and 56. Each prong is equipped with a guarding structure 58 and a trimming flange 60 which are both free to move on the prong external surface. Prongs 50 and 52 engage seed 42 along its axis of symmetry, thereby causing the soft avocado pulp to follow the spinning or rotation movements imposed on the seed by the prongs as they rotate. Paring tool 62 is supported by shank 64 actuated by actuator 66 mounted on jig 68 which is guided to move in a direction parallel to centerline 48. Jig 68 is actuated by rotating drive screw 70 driven by electrical motor 72. Flesh cutter 74 is supported by shank 76 actuated by actuator 78 mounted on jig 80 itself guided to move in a direction parallel to centerline 48. Jig 80 is actuated by rotating drive screw 82 driven by electrical motor 84. The removed avocado skin falls onto collecting belt 86 and the removed avocado pulp falls onto collecting belt 88. The actuation of these belts is not shown, being well known in the art. Seed 42 falls between belts 86 and 88, after the pulp is removed and prongs 50 and 52 are retracted, into a collecting container not shown, for later disposal.

On FIG. 2, the electrical motors needed for driving the actuation mechanisms, not shown, of the holding pins, the holding pads, the avocado contour sensor and the positioning cones (conical structures) are indicated as 90, 92, 94 and 96 respectively. These are located with respect to the avocado approximately as shown. The above-recited mechanisms and/or components are positioned and supported by a structural frame 100, schematically shown supporting the ends of drive screws 70 and 82, and their respective actuating motors.

Referring to FIG. 3, the movement of these mechanisms and/or components are presented schematically by diagrams depicting motions as a function of time, or activation as the case requires, where $\tau$ represents the duration of a full processing cycle for one avocado. T is a variable time, during a cycle, which depends on the size of the avocado being processed, 1, 2, 3, etc . . . represent fixed time amounts or units of time. The operational step of flesh cutting (or pulp removal) corresponds to the only operation that necessitates an adjustable duration (avocado size) and which causes T and $\tau$ to be variable.

FIGS. 4 to 9 illustrate the operation of the conical structures used for transferring the avocado from the feeding station to the operating (or processing) station. The positioning and the centering of the avocado are performed by two oppositely located conical surfaces 102 and 104 defined respectively by the internal surfaces of conical structures 106 and 108. Both quasi-spherically shaped ends of avocado 40 nestle into the conical holders so formed which position the avocado longitudinal axis in line with the centerlines of prongs 50 and 52 guiding conical structures 106 and 108, which are actuated by arms such as 110. To enable the conical structures to move out of the position shown in FIG. 4, both have an opening 114 as indicated in FIG. 5 which permits them to swing freely by prongs 50 and 52, as shown by contour lines 116 which represent the paths followed by the axis and edges of these conical structures during the swinging motion. This swinging motion is illustrated in FIG. 6, where arm 111 is shown moving between position 111' (avocado-seizing position) and position 111 (avocado processing position and/or station).

Conveyor system 118 brings avocados to a position 120 where the avocado rests in shaped cup 121 articulated around axle 122 and actuated by actuator 124. When avocado 120 is seized by the cones, cup 121 swings down to position 121' by means of actuator 124. Stop 126 insures that cup 121 always returns to the same rest position 121. Phantom line 128 corresponding to the largest avocado size anticipated shown how the avocados always clear the tip of cup 121 when in position 121'. FIG. 7 indicates how the actuating mechanism of cup 121 is located so as not to interfere with the free unhindered dropping of the avocado from position 120' to position 120. The soft padding installed inside cup 121 is not depicted but serves to absorb the small shock created by the free fall of the avocado from position 120' to position 120. Motor 96 actuates arm 111 which supports the assembly 115 of the conical structures, their guide and actuators, represented by phantom lines and that includes the mechanisms shown in FIG. 9 in more detail. These comprise guiding shaft 115' on which members 117 and 119 are guided and support arms 110 and 112. Members 117 and 119 are actuated by actuators 123 and 125, respectively. These actuators are mounted on anchor 127 affixed to shaft 115'. Sliding members 117 and 119 each have a sliding key (not shown) sliding in grooves 117' and 119' cut into shaft 115'. Shaft 115' is rigidly held by connecting arm 113 supported by shaft 129 located in line with the axis of rotation of the avocado, but beyond motor 56, so as to avoid physical inteferences during the swinging motion of arm 111.

FIG. 10 illustrates a typical driving mechanism of either the paring tool, the position sensor or the flesh cutter. Those three mechanisms are similar and generally operate in the same fashion. The callout numbers correspond to those of the paring tool drive presented in FIG. 2. FIG. 11 shows how the softness of a ripe avocado is handled with the use of a guard plate 130 which is shaped to form a double curvature (saddle-shaped surface) in a manner such that no excessive pressure is ever applied at a single point onto the avocado. Radius R corresponds to the longest radius of the external surface of the largest size avocado to be processed. Radius r corresponds to the shortest radius of a concave external surface that an extremely shaped avocado may exhibit ever, in a plane such as that of FIG. 4 (radius r'). Shaft 132 holding the guard plate is articulated at point 133 which is located as close as possible to the guard plate center (contact with the avocado) and oriented in the direction of arrow f (pushing against the avocado external surface). Four tension springs such as 134, connecting the four corners of the guard plate to a fixed location on shaft 132, insure that guard plate 130 always returns to a position orthogonal to the direction of arrow f. As shown schematically in FIG. 11, the guard plate corresponds to the sensor end. Point 133 indicates where and how the avocado contour is first detected and corresponds to the point of tangency between the avocado external surface and the saddle-shaped guard plate, regardless of the position of the plate along the avocado contour, at all times the sensor is engaged.

Referring to FIGS. 12 and 13, avocado 40 in the processing position is shown being supported by three holding pins such as 135 actuated by actuators such as 138 mounted on circular structure 140 connected by arm 142 to motor 90. Each holding pin is terminated by a needle point 136 jutting out of a flat rest surface 137 which is stopped by the outer surface of hard seed 42. Structure 140 may also support holding pads such as 150 and 151 and their actuators shown in phantom lines and in their retracted positions. When pins and pads are retracted, their inwardly directed ends clear contour path lines 139 and 139', which correspond to the largest avocado size over anticipated, whenever arm 142 swings in and out of position. Also, the opening between the ends of structure 140 is wide enough to clear the largest size avocado at its maximum diameter location.

The details of a prong such as 52 are presented in FIGS. 14 to 17. The prong itself consists of a core 152 connected to cylindrical shell 154 by two helically-shaped walls 153 and 155 so that two flutes are formed. Core 152 terminates at one end with conical screw 156 and flange 158 at the other. Holes such as 159 in shell 154 allow the waste cut by the prong out of the avocado to be vented into stationary guarding structure 160 from where it is collected and later disposed of. Structure 160 is restrained axially with respect to shell 154 but not rotationally. Also guided by shell 154, trimming flange 162 can slide axially and rotationally thereon and is caused to spin as required when engaged by means not shown in detail but schematized by lever 163 actuated by rod 164. Trimming flange 162 comprises an outer ring 166 and a hub 167 connected by blades such as 165. The cross-section of a blade is shown in FIG. 17 paring off skin 44 from pulp 46. The cutting edge of such a blade is similar to the sharp end 169 of wall 155 which engages seed 42 extremities.

FIG. 18 shows a cross-section of the flesh cutter which has a funnel-like shape and a sharp edge 75 extending approximately ⅝ of a full circle so that the cutter can engage the avocado pulp 46 equally well at all angles required in both directions. This preferred embodiment is shown cutting a layer 77 of pulp 46 off avocado 40 and which leaves void 79 behind as the avocado rotates or spins in the direction of arrow f. Pulp 77 is evacuated through tube 81. FIG. 19 presents an alternate embodiment of the flesh cutter which is caused to move in a direction parallel to the avocado axis of symmetry. In the process, a sliver 77' of avocado 40 pulp is shaved off and falls in receptacle 170 to be collected and evacuated through tube 81'. The shaving off is done by wire 171 held in tension by the two ends of arc 170' supported by shank 76'. Such a taut wire cuts through the ripe avocado pulp as does a steel wire through butter. FIG. 20 shows the detail shape of one holding pad 150 engaging seed 42 by means of blunt point 173. Pad 150 is mounted on shaft 175 which is actuated by an actuator as shown in FIG. 12.

Referring now to FIGS. 21 to 27, an alternate embodiment of the paring tool is presented. Such a paring tool operates as does the well known twin-blade potato peeler. This paring tool moves in a direction parallel to the longitudinal axis of the avocado which remains still while a paring pass is being completed. Each pass is from one end of the avocado to the other. The avocado is caused to rotate a small fraction of a revolution between consecutive passes. The same mode of operation applies when the flesh cutter of FIG. 19 is used. In this case of embodiment of the paring tool, the slicing of the skin can be facilitated with the use of a vibrator mounted on one end of the tool-holding fork 63 (FIG. 22), which then imposes a sawing action on the paring tool. The vibrator is not shown, its use being well known in the art. The paring tool consists of two blades 176 and 178 having oppositely positioned cutting edges 177 and 179, respectively. The blades form a flat loop structure 180 articulated in holding fork 63 by trunnions 181 and 182. One trunnion, 182 for instance, is also free to oscillate slightly sideways, being articulated in an elongated and slightly curved groove (FIG. 27). The amount of rotation of structure 180 is limited by stops 184 and 185 if and when they contact fork 63 structure. Shank 64' is free to slide on shaft 64 supported by the jig actuating the paring tool and constantly pushed forward by compression spring 186 so that a steady pressure is exerted by the paring tool against the avocado. FIG. 24 indicates the degree of orientation changes that the paring tool and/or the sensor guard plate must go through to conform to the avocado shape, as their contact point moves from one of its end to the other. FIGS. 25 and 26 diagrammatically show the position that the articulation axis of the two-blade paring tool must assume to make its operation automatically stable.

FIGS. 28 to 30 present the preferred embodiment of a paring tool which operates similarly to the sensor guard plate. It can be visualized as the guard plate of FIG. 11 having two stamped half dimples, facing one another and bulging in opposite directions, separated by an opening 190. Assuming that avocado 40 spins in the direction of arrow f and that pressure is applied onto guard plate 191 against the avocado, the sharp edge 190' of lower half dimple cuts into the avocado skin, as in a peeling action. The articulation and support of this paring tool are similar to those of the configuration shown in FIG. 11. In this embodiment of the paring tool, the constant necessary pressure exerted by the tool onto the avocado is also provided by a compression spring, as illustrated in FIG. 22.

Referring to FIG. 31, a vacuum system is schematically represented by vacuum pump 200 maintaining a pressure lower than ambient in containers 202 and 204. Container 202 is connected to the guarding structures supported by the prongs and stores the waste material extracted by the prongs. Container 204 is connected to evacuation tube 81 of flesh cutter 74 and receives the removed pulp. Seeds 42 free fall in container 205. The pared off skin is collected onto conveyor belt 86. The material removed by the trimming flanges is collected by conveyor belts 206 and 207.

FIGS. 32 to 35 present an arrangement of the paring tool and of the flesh cutter whereby both are mounted on a common jig rotating as a turret configuration. The two basic movements of both tools along axes X and Y are provided by common keywayed platforms 210 and 212. Platform 212 is part of frame 100. Platform 210 slides on platform 212 when actuated by drive screw 214 and turret base 216 slides on platform 210 when actuated by the other drive screw 218. Turret 220 pivots around axle 221 and is actuated by rack 222 driving gear 223. Two locking bolts such as 224 secure the flesh cutter and the paring tool on the turret. A locking mechanism 225 insures that the turret is always secured in position whenever either tool is operating. A rotation of 90° of the turret causes either tool to become operating as selected by the signal sent to actuator 226 of rack 222. Drive screws 214 and 218 drive fixed nuts 228 and 230, and are actuated by motors 229 and 231, respectively.

In FIG. 34, locking mechanism 225 is depicted showing how ball 233 can move in and out of cylindrical cavity 234 when actuated by stem 235 and an electromagnet, not shown. The interface plane 236 between turret 220 and base 216 contains cavity 234 centerline. In retracted position 237 (phantom lines), ball 233 does not interfere with the turret rotation. When the ball is in the solid line position (locked), the turret becomes fixed. Electrical leads 239 bring power to the magnet.

FIG. 35 presents a list of the processing steps needed for removing the avocado pulp. The component used in the performance of a step is also indicated. Whenever a signal is generated by a component, this signal is listed accordingly. Such signals indicate positions and are inputed into a central processing unit for storage and subsequent handling by a computer. The combination of signal generators, central processing unit and various actuating mechanisms required for the operation of the apparatus constitutes the control system which is shown diagrammatically in FIG. 36. The corresponding signal numbers indicated in FIGS. 35 and 36 depict the correlation that exits between the two figures and render it easier to relate the information contained in one figure to that which is contained in the other. The operation of this control system is described and discussed in the following section in detail.

DISCUSSION AND OPERATION

Although the basic operation of the control system is approximately the same for both embodiments of the apparatus, the basic approaches taken for removing both skin and pulp are different enough to justify a separate discussion and operation description. One functions basically as a lathe and the other as a shaving peeler. The lathe-type operation is the preferred embodiment of the apparatus, the peeling and shaving operation constitutes the alternate embodiment, as earlier mentioned. However, both embodiments pertains to the processing of avocados and have much in common. This common aspect is discussed first.

It is assumed in the following that the avocados brought to the feed station by belt system 118 have previously been selected to present common and desirable traits such as: shape, size, degree of ripeness and condition. The kind of avocado is not relevant, as avocados of the same kind (species or type) have homologous shapes and dimensions varying in the same proportion from one sample to the next. The nature of the avocado fruit (though considered a vegetable for culinary purpose) is somewhat unique and must be elaborated on. It must be picked off the tree at a certain degree of maturity and left to ripen by itself. It does not properly ripen on the tree. If picked too soon, its content of fatty materials is to low and it will not ripen but shrivel. If left too long on the tree, the seed starts shrinking and the thin skin located between the seed and the pulp remains generally attached to the pulp. The seed is left free to rattle inside the fruit. This thin skin has a disagreeable taste, no texture and tears up easily, making it impossible to handle with a machine, and even messy to remove by hand. However, if and when picked at the right stage of maturity, this thin skin remains attached to the seed, but seldom adequately loose from the pulp. The softness of the pulp of a ripe avocado adds another difficulty to being able to hold the fruit, even for hand processing.

There are several kinds of avocados. Some have soft skins and some have a hard skin, more like a shell, like the Haas variety. The soft skin variety includes such kinds as the Calavo, the Zutano and the Fuerte. Shapewise, Fuertes and Zutanos represent the two extremes: the Fuerte being rather short (small L/D) and without the double curvature feature; the Zutano having the highest L/D and exhibiting the most pronounced double curvature feature. Also, the Haas which has the smallest L/D is usually characterized by the least regular shape. Furthermore, when ripe, the hard shell detaches itself from and slides on the pulp, which disqualifies it for machine processing. The following applies to those avocado varieties similar in shape and characteristics, when ripe, to the Calavo, the Fuerte and the Zutano. The desirability of one variety, tastewise as compared to another, is beyond the scope of this discussion. The seed (also referred to as pit, though totally different from the typical pit of a drupe fruit) exhibits a l/d varying in proportion as L/D according to the variety. For each variety, a statistically defined L/D,l/d and type shape can be established and used as model for the purpose of the processing operations. When the avocado reaches a fair degree of ripeness, the part of the stem still attached to the fruit falls off very easily. The removal of the stem leaves a small indentation located at the tip of the small end of the fruit, from which, sometimes, stringy fibers emerge and diverge deep into the pulp, which makes such avocado less desirable. This defect is more pronounced for some varieties and depends on various factors that affected the fruit development. It is also more serious near the small end of the avocado.

Another important feature present in some ripe avocados, is the presence of the beginning of a root system at the large end of the seed, along the centerline of the fruit. Sometimes, the start of the root system corresponds to a beginning of the splitting process of the seed into two halves, along a plane passing by the seed centerline. This can affect the degree of securing of that end of the avocado by the prong. The importance of these two features can be minimized by a proper monitoring of the picking and ripening processes of the fruit. They will therefore be ignored from now on in the discussion. In all instances, it is important to insure during all handling steps that the ripe avocado softness does not give it causes to become bruised and/or dented. It will be assumed henceforth that all avocados present on belt system 118 so qualify.

In summary, it appears that the best way to preserve avocados is to leave them on the tree until one is ready to eat them in a few days. This is hardly a practical commercial approach. Refrigeration delays the ripening process, at the expense of quality. Although the picking season can be extended to six months, the best quality results when it does not extend beyond two months. Except for citrus fruits, this represents a trait rare for most fruits. The distribution of ripe fruits to retail centers is not practical, because of handling difficulties. Refrigeration is not completely satisfactory. Nobody has yet proposed canned avocados. These factors have hampered the large scale distribution and sale of avocados. Frozen avocado paste is merchandized, but is expensive because of the high avocado processing cost (labor) and high volume sales cannot be envisaged. The present invention offers a practical solution to the labor cost problem. In the continental US, avocados are grown chiefly in California and Florida. The seasons being Mid-October to May for the varieties of interest for California, and two months earlier for Florida. For all practical purpose, not much more than three months annually are available for processing ripe fruits. The frozen paste can easily be preserved six months to a year, thus making a form of avocado pulp available all year round. The processing cost of the avocado being the key factor.

Practically, the apparatus and method of the present invention are then required to insure only that:

(1) the emerging root system is always eliminated prior to removing the pulp;

(2) the degree of ripeness of the avocado is right;

(3) dents, bumps and/or bruises on the avocado are avoided; and (4) a large enough portion of the small end of the avocado is eliminated from the removed pulp to minimize the inclusion of bits of stringy fibers in the paste. The following describes and discusses in detail the approach and the sequenced operations which enable the apparatus of the present invention to achieve this.

Preferred Embodiment

The preferred embodiment of the invention apparatus is based on the machining approach used in a lathe: a cutting tool is caused to move along two orthogonal directions. If the two movements are properly synchronized, the tool can then follow a curved path so as to remove a quasi-constant thickness layer of material on a curved contour, between the outer surface of the avocado and the outer surface of the seed. A preselection of avocados of the same kind may first be made when the fruits are still hard, by simple mechanical means, to separate those avocados which have a shape most closely resembling a body of revolution. The others can then be made available for sale in stores. The selected specimens are then allowed to ripen to the right stage, at which time they can be placed on the conveyor belt 118. From then on, special care must be taken in handling of these ripe avocados.

The mechanisms schematically shown in FIGS. 6–9 illustrate how such care is exercized. While on the conveyor, the avocados (40' and 40'') are nestled between two layers 41 and 47 of soft material such as foam rubber attached to belts 49 and 51 respectively. These belts are supported by a plurality of rollers 53. Above the operating station, the avocados are freed from the two well padded belts and are allowed to drop a small distance onto a well-padded specially shaped receptacle. Such padding absorbs the small shock thus imparted to the avocado and spreads the resulting pressure over a large area on the avocado. From then on, the avocado is never allowed to move freely and is always supported by means compatible with its degree of softness. The internal surfaces of conical walls 106 and 108 are also padded and actuators 123 and 125 are allowed to exert only a limited amount of pressure onto the avocado outer surface. Furthermore, the external surfaces of the paddings of conical walls are coated with a material minimizing friction, such as Teflon. The cone angles of walls 106 and 108 are such that the gentle nudging exerted by the combination of the converging motions of these two cones automatically positions the avocado centerline in line with their axes of revolution. Receptacle (or shaped cup) 121 can then move out of the way so that arm 111 is then free to swing to the station where the avocado is to be processed.

Because the friction between the avocado skin and the internal surfaces of the cones is minimal, it is not relied upon to hold the avocado still while necessary external forces are exerted on the seed for the purpose of securing the avocado. The holding of the avocado is thus performed with the transitory use of mechanical means directly seizing the seed. This is accomplished by causing pins 135 to converge synchronously toward the seed, in a plane where the transversal cross-section of the avocado is maximum. It is assumed, as is generally correct, that the transversal maximum cross-section planes of the avocado and its seed are very close to one another. A sensor is caused to travel toward the avocado to make contact with the avocado skin and then to travel between the edges of the cones, keeping contact with the skin by means of a spring-actuated stem. The transversal motion (X) of this stem and the longitudinal motion (Y) of the sensor are detected and signals are sent to the Central Processing Unit (CPU). The CPU computer determines the location $Y_m$ at which X reached its maximum value ($X_m$) during the sensor travel. The motor actuating the Y-motion of pin 135 holder then positions arm 142 at a location along the Y-axis where $X_m$ was detected. Arm 142 is caused to swing in place so that pin holder 140 encircles the avocado, with the pins in a fully retracted position.

Pins 135 are also each mounted on a spring-loaded stem actuated by its own actuator. The pins displacements along their axes are detected and the forces exerted by their actuators are also detected. FIG. 37 shows schematically how such displacements can be automatically detected. The following applies equally to the sensor stem and the paring tool shank which also provide displacement sensing means. Stem 250 supports the subject tool and rod 252 is connected to the actuator thereof. Stem 250 ends with a piston 254 sliding inside cylinder 256. Piston 254 also acts as a switch making contact with rheostat 258 mounted on cylinder 256 wall. Compression spring 260 always exerts a force opposing the inward motion of piston 254. Electrical leads 251, 253 and 255 serve as carriers for the detected signals. As required, the actuators of such components are also equipped with displacement and force sensors, for reasons explained in the following.

The inward movements of the three pins are synchronized and their pointed ends are always kept at an equal distance from the virtual centerline of the avocado. Virtual, because it may not exactly always coincide with the real centerline, but is assumed to be close enough in all cases. As the pointed ends of the pins all progress toward the avocado skin, events occur as follows: the skin is effortlessly pierced by the needle point and piston 254 does not indicate relative motion with respect to cylinder 256; the quasi-flat shoulder 137 of the pin reaches the skin and an increase in the force pushing the pin in and its radial position are then recorded; the pin shoulder penetrates through the pulp and this radial displacement is also detected until the pin shoulder reaches the outer surface of the seed; signals are sent to the CPU indicating at which values of X the three pin shoulders made contact with the skin and the seed outer surface; and these values are compared to determine the degree of centering of the avocado. The three pins are located 120° apart so that the pin readings can define the size and position of a true circle, which the contours of the avocado and seed cross-sections are assumed to be. The reading of the pin having last reached the skin is used to define the avocado maximum diameter and the reading of the pin having first reached the seed is used to define the seed maximum diameter. The maximum diameters of the outer ($D_{max}$) and inner ($d_{max}$) contours of the pulp are thus established in a manner such that the likelyhood of the pulp volume thus defined encompassing either some skin or some seed material is nil. It follows that some pulp is included with the skin and with the seed in such an approach, when used to calculate the pulp volume to be removed. At this juncture, the cones can be retracted.

The two prongs are then caused to rotate in opposite directions and are advanced toward the avocado then firmly held by the pins. They bore their way through the skin, pulp, emerging root and fibers (as the case may be), and conical screws 156 insert themselves partly into the seed. When the torque required to insert those screws exceeds a set value, the driving of the prongs stops and the avocado is then firmly supported by the prongs so that the pins can be retracted. The avocado is ready for material removal by means of revolving the avocado around the prong axes.

Another approach to computing this pulp volume is to use the displacements of the paring tool of FIGS. 28-30 as means for determining the contour of the whole avocado. When the pins have secured the avocado by means of their needle points, the cones are retracted and the paring tool is advanced. Its cutting edge makes contact with the avocado skin and as the avocado is caused to rotate, the skin is removed as the paring tool is also caused to move in the Y direction. As earlier explained, the guard plate of this paring tool type behaves as a sensor. A fixed thickness of skin and pulp is removed around the avocado and the guard plate follows the avocado contour, both in the X (radial) and Y (longitudinal) directions. As described earlier, the values of X and Y generated by a detecting system mounted on the paring tool shank and by the paring tool jig actuating mechanism, which is also detecting position, are sent to the CPU. The contour of a skinned avocado ready to be defleshed is thus stored in the memory bank of the CPU. Again, the "safe" external contour of the pulp volume to be removed by the flesh cutter is calculated. "safe" means, as it did earlier, that no skin material is included in that volume. In this approach, relating the angular rotation of the avocado to the X and Y locations will permit to eliminate the loss of an excess of pulp with the pared off skin. Such a degree of refinement is a matter of cost tradeoff and needs no further elaboration in this disclosure.

To discard some unwanted material and facilitate the operations of both the paring tool and the flesh cutter, it is practical to remove some skin and pulp at both ends of the avocado. This is done with the trimming flanges sliding on the external surfaces of the prongs (FIG. 15). Again, the displacements of these flanges are detected and the data is stored in the memory bank. The advancing of the flanges automatically stops when outer rings 166 reach the skin and the pushing forces and torques required to drive them exceed set limit values, at which time they are retracted. The end trimming operation applies to both approaches discussed above. Limits for the Y-displacements of the paring tool and of the flesh cutter are accordingly set by the CPU computer.

Cutting the flesh of the avocado comes next. It is obvious that the flesh cutter cannot remove the pulp in one pass. Referring to FIG. 32, the skinned avocado pulp is shown requiring a total of three passes. Contour 42' represents the avocado after skinning. Contour 42" represents the seed outer surface with the residual layer of pulp attached. Contours 42a and 42b represent the contours exhibited by the avocado after the first and the second passes respectively. Contours 74' and 74" represent respectively the paths followed by the flesh cutter center (plan profile assumed to be circular) and its outer edge (envelopes of circles rolling onto contour 42'). Contour 74a represents the path of the flesh cutter center when it is making the third and last pass. The inner located contours are shown only around the large hemispherical end of the avocado and the end trimmings are omitted for the sake of clarity. According to the maximum thickness that it is deemed safe for the flesh cutter to remove in each pass, the pulp thickness thus establishes the number of passes n that is required for that skinned avocado. n is computed by the CPU computer which has already calculated this total thickness.

Although FIG. 32 pertains to a turret arrangement, its operation is similar to that of a two jigs arrangement (FIG. 2), one jig for the paring tool and another for the flesh cutter. In the latter case, for practical purpose, the paring tool jig and the flesh cutter jig are shown operating on both sides of the avocado. With a turret configuration, both jigs are located on the same side, which leaves the other side available for locating the avocado feed station and the system used for transferring the avocado from the feed conveyor belt to the processing station. In such an alternate location arrangement, the avocado needs not be dropped as previously described, but may be seized by the cones directly off a one-belt conveyor system. Referring to FIG. 6, such alternate avocado positioning system will be located symmetrically opposite to the system presented therein, with respect to a vertical plane perpendicular to FIG. 6 plane and passing through the axis of shaft 129. In such a case, system 115 will be located in the upper half of FIG.-6 plane, but will operate in a similar fashion. The turret arrangement will then be located on the side where the avocado transfer system is now shown located. The position of the paring tool of FIGS. 28–30 needs only be inverted upside down when the paring tool and the flesh cutter are not on the same side of the avocado, the rotation direction of the avocado appearing as being reversed to the tools.

In all instances, the locations of the trimmed avocado faces at both ends, are detected, recorded and set as the limits for the travels in the Y direction of both the paring tool and the flesh cutter. As earlier shown and mentioned, both tools can move in either direction and concurrently with being capable of moving in either direction along the X axis. The paring tool operates as a contour follower, whereas the flesh cutter motions are preprogrammed by the CPU computer according to the skinned avocado contour profile calculated from the position data detected by the paring tool and/or the holding pin displacements. Each contour is defined by a series of straight line segments being joined at their ends, each end of a segment being the beginning of the contiguous segment. Ends or beginnings are defined by two values: $X_i$ and $Y_i$; the next extremity of the subject segment being then defined by: $X_j$ and $Y_j$, for subject segment i−j. The beginning of the first segment is defined by $X_a$ and $Y_a$, and the end of the last segment is defined by $X_z$ and $Y_z$, assuming that there are 25 segments altogether, as an example.

A segment such as $X_i,Y_i-X_j,Y_j$ of FIG. 24 makes an angle $\alpha_{(i-j)}$ with the Y-axis which defines the ratio $r_{i-j}$ between the linear velocities $V_x$ and $V_y$ which the flesh cutter jig must have in the X and Y directions (where $V_x = V_y \cdot \tan \alpha_{(i-j)}$) of the cutter edge displacement along said segment. At each segment end, the computer calculates the new angle of the following segment and the ratio of the new velocities to be yielded by the motors actuating the jig in the X and Y directions. The process is continued until the flesh cutter jig reaches the limit "a" or "z" of its Y-stroke, at which time the jig velocity and displacement directions are reversed. At that time, an incremental advancement of the tool is provided by advancing the jig toward the avocado axis in the X direction, by an amount $\Delta x$ determined by the CPU. The process is so repeated until the flesh cutter has completed the number of passes n that the computer calculated. As each pass gets closer to the seed an/or the external surface of the prongs, the number of segments may be reduced in order to shorten the Y-stroke and minimize the pulp-removing duration. This is part of the computation process of the number n of passes that is based on removing the maximum possible amount of pulp during each pass which is also established to be as short as possible. This results in optimizing this operational step, which is inherently the longest.

When the last pass of the flesh cutter is completed, some avocado pulp remains attached to the seed, as precautionary measure, so that no part of the thin seed skin becomes inadvertently incorporated in the removed pulp. The seed is very slippery and the prongs still holding it must be retracted, insuring that the seed is left free to fall in the process. Because it is impossible to disengage both prongs rotating in reverse directions in a manner such that the seed could be left still, the seed must be firmly held during the prong disengagements. To that effect, holding pads 150 (FIGS. 12 and 20) are used. Their pointed ends are obtusely shaped so that the points penetrate the seed material in a way intended to prevent the seed from turning but not to hold it when the holding pads cease to exert pressure. Upon their retracting, the seed is freed and falls into a disposal container.

To minimize the exposure of the removed pulp to air and to facilitate the evacuation of this pulp into a secured container, the pulp falling into the funnel formed by the flesh cutter is sucked into tube 81 (FIG. 18) and is collected in evacuated container 204 (FIG. 30) where further pulp processing may be performed as needed but which is beyond the scope of the present invention disclosure.

ALTERNATE EMBODIMENT

The alternate embodiment of the invention apparatus is based on "scalping" and/or "shaving" a layer off the avocado then held in a stationary position. The two operational steps which totally differ from those discussed above are those of skin removal and of pulp removal. All the other steps are identical and need no futher elaboration. The tools used in this embodiment differ but their mountings on jigs and their motions are also similar to those previously discussed and need not be repeated. The tools and/or jigs can be positioned one on each side of the avocado or can be positioned so as to make use of a turret arrangement and be located both on one side of the avocado. The basic difference is in the manner in which the skin and/or pulp sectioning is performed. In this embodiment, the avocado remains still while the tool operates and the avocado rotates only when neither tool is engaging any part of the avocado. The paring tool of FIGS. 21, 22, 23 and 27 is also used to establish the avocado contour, and to generate signals accordingly because it also operates as a follower and the thickness of skin and/or pulp that it automatically removes is fixed and set by its shape and articulation.

The automatic operation of this paring tool requires additional discusion. FIGS. 24 to 27 can be used to that effect. The paring tool has two cutting edges, but only one can be engaged at any one time. The unengaged cutting edge then acts as an aumatic depth stop as it keeps sliding against the surface to be shaved, as shown in FIG. 21 where edge 179 engages the avocado when the tool moves in the direction of arrow f' and/or the avocado surface 40" moves in the direction of arrow f", as long as the tool is free to oscillate around point O and point O remains positioned onto or very near the line defined by the two cutting edges. This is illustrated by the diagrams of FIGS. 25 and 26 where arrow f indicates the relative displacement direction of the tool and of the avocado. O is the articulation point of the tool through which cutting force F is applied and C is the cutting point through which the reaction F' of the material being cut is applied. d' and d" are the distances separating these two forces. In one case, this action induces a rotation $\omega'$ and in the other case a rotation $\omega''$ of direction opposite to that of $\omega'$.

The paring tool must be pushed against the avocado to cause a paring tool edge to engage and cut the avocado skin. A force $\phi$ developed by the compression of spring 64' (FIG. 22) provides such pressure. As long as that edge has not cut into the skin, force $\phi$ is applied halfway between the two edges. As soon as the paring tool moves, the reactions from the avocado on each edge affect the stability of the tool. With the direction convention of FIG. 21, for example, edge 179 has a natural tendency to begin cutting in, whereas, edge 178 has no choice but to slide on the avocado skin. This would normally cause the tool edge to engage itself deeper, but the reaction on the tool edge of the layer being cut also increases further, because of the circular shape of an avocado cross-section. The reaction from the tool holder increases to balance the force exterted on the tool edge. All the forces acting on the paring tool must be resolved into one resultant force passing through point O (free articulation) and a resulting torque around point O. If point O were clearly located on the right side of contour R (FIG. 21), edge 179 would not even engage the avocado skin, because the tool rotation earlier mentioned would tend to pull edge 179 away from the avocado (unstable condition theoritically, case of FIG. 26). However, as the paring tool rotates around point O, because of the shape of the tool, edge 179 becomes closer to force $\phi$. This, combined with other factors, results in limiting the engagement of the tool. A typical other factor can be the shape given to one of the positioning means of the tool at one of its two supports (FIG. 27) which can be given a shape such that the tilting of the paring tool caused by the cutting effort moves trunnion 182 a distance $\delta$, either inward or outward depending on the direction given to the curvature of groove 183, relatively to the direction in which force $\phi$ is applied. The correct combination of shapes, dimensions, angles of attack of the two edges and design configurations results in the paring tool edge assuming a stable cutting attitude as soon as it becomes engaged, as the well and commonly known potato peeler with a free oscillating double-blade easily demonstrates. Stops 184 and 185 are only intended to prevent the tool from rotating 180° freely in either direction, so that the paring tool always presents itself to the avocado correctly, at any location on a typical contour such as 44 (FIG. 24), in either direction, i.e. when moving to the right or moving to the left.

Because the avocado skin is somewhat irregular in texture, it is desirable to impart a slight sawing action to the paring tool so as to ease any random irregularities in the magnitude of the forces acting on the paring tool. Such irregularities could adversely affect the skin cutting action of the tool. Such sawing action needs have only a small amplitude, such as that provided by a vibrator mounted on frame 63 and acting in a direction parallel to the cutting edges. When this paring tool is used, the paring tool jig should travel past the trimmed faces at either end of the avocado, in order to facilitate the tool orientation before a cutting pass starts.

During each pass lengthwise of the paring tool, the avocado does not move. Between each pass, the avocado is caused to rotate a small angle $\gamma$ which corresponds slightly less than the width of the band of skin removed. This insures that each band is wider than the skin width on that band (or ribbon) and that no skin is left on the avocado when it has completed a full turn. The number m of longitudinal passes per avocado full revolution depends on the degree of safety desired and on the pulp amount $\epsilon$ that the operator is willing to discard with the skin to insure that safety. Number m is of course $360/k\gamma$, if $\gamma$ is expressed in degrees. It is determined by the CPU computer as a function of $\epsilon$ which is expressed as a fixed dimension. The degree of safety is expressed by a factor k smaller than unity which establishes the degree of overlapping of two consecutive passes of the paring tool. As earlier mentioned, as the paring tool moves back and forth, the edge which is not cutting, but sliding on the uncut avocado skin, provides the position detecting or sensing device for generating the avocado contour data which the CPU needs for determining the cutting program of the flesh cutter.

Because the pulp of a ripe avocado is very soft, a thin taut wire can easily cut through it. The flesh cutter shown in FIG. 19 depicts how a layer 77' can be sliced off the pulp of avocado 40. Pulp layer 77' falls into shaped funnel 170 as it is separated from the avocado, which is not rotating but still. Wire 171 is caused to move back and forth along the avocado longitudinal axis. The avocado is caused to rotate an angle $\gamma'$ between each passes. $\gamma'$ corresponds to a number m' of such passes for each complete revolution of the avocado so that $\gamma'=360/m'$, if again $\gamma'$ is expressed in degrees. A maximum thickness t of layer 77' is specified by the operator to the CPU computer and for a maximum avocado diameter ($D_{max}$) determined from the signals sent by the sensor, the computer calculates $\gamma'$ and m' using tabular values stored in the CPU memory bank in which $\gamma'$ is expressed as a function of $t/D_{max}$. The number of full revolutions of the avocado n' is determined by the computer and corresponds to the maximum pulp thickness (maximum shortest distance between seed and skin) established for the avocado to be processed divided by t. The total number of flesh cutting passes is then n'$\times$m'. This is to be compared to n$\times$N (if N is the number of full turns per pass of the avocado in the preferred embodiment case) if one wishes to determine the most rapid method of removing the pulp. In the case of the wire flesh cutter, the programming of the passes is also based on the approach of shortening the strokes of the jig supporting the flesh cutter, as soon as all pulp has been removed from the small end of the avocado, in order to minimize the total processing time per avocado.

If a sensor is used to determine the full contour of the avocado instead of the paring tool, the paring off of the skin can also be accomplished by means of a thin taut wire. Such a wire needs a rough surface and a slight sawing motion, which can also be provided by a vibrator. The avocado skin can be sliced off in such manner, but the path of the wire must be predetermined and programmed in the manner described for the flesh cutter. One disadvantage is the risk that minute pieces of sawed off skin are left on the skinned pulp. A preliminary pass by the flesh cutter shaving off a disposable thin outer layer of pulp, first before starting the pulp removal, solves this potential minor problem.

CONTROL SYSTEM

The programming and the control of the apparatus operation are very similar for both embodiments. The main differences revolve around the coordination of the avocado rotation and the tool motions (paring tool and flesh cutter). This subject is treated in enough detail above and needs no further elaboration. To facilitate the following discussion, the use of the preferred embodiment apparatus is assumed, except as specifically indicated, and it is also assumed that both paring tool and flesh cutter share the same turret arrangement (FIG. 32).

The time diagram of FIG. 3 indicates the timing of the various operational steps entering into the complete processing cycle of an avocado by the apparatus. FIG. 35 table relates such operational step to the component (or mechanism) used for performing the task to be accomplished during that step. The type of signal generated during that step is also identified, so that the table information may easily be correlated with the information given by the block diagram of FIG. 36, which also refers to those signals with the same callout numbers. Numbers 0 to 4 refer to types of signals and numbers 6 and up refer to connecting lines between various components and/or mechanisms.

The 0-type of signals are generated by the sensor. In its simplest form, it only detects and measures the corresponding values of X and Y in the vicinity of $D_{max}$ to determine the exact location of $D_{max}$ and its value. In its most complex form, it can detect and measure the positions of a family of points on the external surface of the avocado along a grid of intersecting lines defined as the intersections of the avocado external surface and of planes (1) passing through the avocado centerline and (2) perpendicular to said centerline. The use of the most complex form of sensing eliminates the need of the sensing function of the paring tool. In their simplest form, the sensor signals are processed by the CPU computer to calculate the value $Y_m$ for which the avocado diameter is maximum. The mechanism supporting the holding pins is then positioned at this point so that the pins penetrate the avocado in or close to the transversal plane where the seed diameter is assumed to be the largest. The penetration of the avocado in that plane is performed simultaneously and synchronously by three angularly equally-spaced pins. At location $Y_m$, two sets of three displacement values are then detected: a first set when the pin shoulders penetrate the skin and a second set when the pin shoulders reach the seed. The three values of each set are then used as follows: (1) they are averaged to calculate the exact true diameters (avocado and seed), (2) the smallest of the first set is recorded as representative of the avocado size, and (3) the largest of the second set is recorded as representative of the seed size.

As earlier mentioned, avocados are classified by kind (or variety) and it is assumed that all avocados to be processed, and of the same kind, are homologous in shape. The external surfaces of both avocado and its seed are homologous. One referenced dimension, maximum diameter for instance, then suffices to determine the whole surfaces of both avocado and its seed. This assumption is sufficiently true, if and when practical precautionary steps are taken such as shaving off a thin layer of pulp with the skin and leaving a thin layer of pulp on the seed when disposing of it. For all avocado kinds to be processed, the coordinates of both the external surfaces of the avocado and of its seed for each of these kinds is calculated and the data is stored in the CPU memory bank (model). The data pertaining to a specified kind of avocado is retrieved to determine the approximate size of any avocado (and of its seed) of such kind as soon as the referenced dimensions of the avocado and of its seed have been established. The other coordinates of the two surfaces of interest are then proportioned in the ratio of the reference dimensions of the model and of the subject avocado. The origin of the X (or radial) coordinates is the axis of rotation of the prongs (and of the avocado). The origin of the Y coordinates is an arbitrary point 0 located on the axis above-mentioned and on the left side of FIG. 32, far enough to be always situated outside the external surface of the largest avocado to be processed so that all coordinates are always positive. The displacement signals generated by the holding pins constitute the first type of signals.

Two signals of a second type are generated by the prongs as they advance toward the avocado, then held by the pins. The actuating mechanisms of the prongs are also sensitive to the force required to advance them. When the cutting edges 169 (FIG. 15) of the non-rotating advancing prongs make contact with the avocado skin, the resulting increase in the driving force is sensed and the prong displacement detected and measured. The prong is then caused to rotate. It cuts its way through the skin and the pulp. When cutting edges 169 reach the seed, there are both an increase of driving force and of torque. The displacement of the prong at that time is also detected and measured. This occurs for both prongs, but not necessarily at the same time. Another set of reference dimensions has then been generated: (1) length of the avocado, (2) length of the seed, and (3) the seed location with respect to the large end of the avocado (dimension X of FIG. 1). This data can be used in two ways: (1) to refine the definition of the avocado and seed contour coordinates if the most complex form of sensor signals are used, and (2) to define such coordinates with the use of three reference dimensions by comparison with those of the model, in the manner previously discussed. Either way, the avocado in process is now defined by its shape, size, length and seed data (location, length and size).

A pair of signals of a third type are generated when the trimming flanges reach the ends of their travels and each leaves a clean flat face of a set diameter at both ends of the avocado. A signal is generated by the sudden increase in driving force and torque of the flange when its cutting blades 165 (FIG. 16) are prevented from advancing further by ring 166 meeting the avocado skin. An initial signal was originally generated when the flange first started cutting into the avocado skin. The positions of the flange at both instants determines the amount of displacement of the flange between these two signals. The Y location of these faces is then calculated by the computer to establish: (1) their positions with respect to the seed, and (2) the ends of the travels (or strokes) of both the paring tool and flesh cutter.

At this juncture, a differentiation must be made between the preferred embodiment and the alternate embodiment, and as to the manner in which the paring tool is used. If the sensing capability of the paring tool is not used, its path is calculated and programmed by the computer and no additional data is henceforth needed regarding any avocado physical information. All that is needed is now known. If the paring tool sensing function is used as earlier described, and the simplest form of sensor function was then used, the paring tool generates signals as it follows the avocado skin which are sent to the CPU and stored. The coordinates of the external contour surface of the avocado are then determined. These signals constitute the fourth type of signals. In either case, the basic data regarding the subject avocado is all in for processing by the computer.

The main differentiation between the two embodiments to be made first concerns the manner in which the avocado is driven. Whether the paring tool follows and detects displacements or its path is preprogrammed, the avocado rotates by small increments at a time, between the passes of the paring tool (and flesh cutter), in the case of the alternate embodiment, but starts spinning continuously in the case of the preferred embodiment. The other differentiation is the pulp behavior during the spinning of the avocado. The incremental rotation of the avocado between passes is less stressful on the pulp than it is when the avocado spins, especially during the last pass of the flesh cutter, when a thinner layer of pulp is left adhering to the seed. The pulp itself has very little tensile strength and its degree of adherence to the seed core in all instances is at least questionable.

Upon completion of the skin paring operational step, in all instances, the computer must have determined a number n or n' of passes for the flesh cutter. The number N of avocado revolutions or m' of the avocado rotational increments must also be established. Numbers N and m' both correspond to removing the first layer around the avocado. As each consecutive layer of pulp is removed, the actual diameter of the avocado decreases and both N and m' are recalculated, based on the new travel limits computed at the end of the preceding travel. The layer contours shown in FIG. 32 on the left hemispherical side of the avocado profile illustrate this process. If contour 42' corresponds to a skinned avocado, contour 42a to the new contour after layer 42'-42a has been removed, the theoretical limits of the flesh cutter travel move from A—A' to B—B', with the distance B—B' being shorter than A—A' and requiring a smaller Y displacement of the tool jig. A smaller number $N_1$ of avocado turns is therefore needed to remove the second layer, and so on . . . . The same applies to m'. As the avocado diameter decreases, angle $\gamma'$ increases and m' decreases, and a smaller number of incremental avocado rotations is needed per avocado revolution, in addition to the fact that the travel of the flesh cutter of the alternate embodiment also decreases. The computer calculates not only n and n', but also N and m', and the limits A—A', B—B', etc. . . . for each successive layers to be removed. The thickness of the layers need not be the same. To insure that the pulp left adhering to the seed is not disturbed, the thicknesses of successive layers can also be programmed to decrease gradually as the flesh cutter approaches the seed.

It was mentioned earlier that the velocities $V_x$ and $V_y$ of the flesh cutter and paring tool jigs were computed by the CPU in order to insure: (1) a proper tool advance velocity (especially appropriate for the skin paring operation), and (2) a proper path of the tools. If only the velocities were programmed and controlled, displacement errors could build up with time. For this reason, at the end of each segment $X_i, Y_i-X_j, Y_j$, the position of the tool is detected, compared to what it should be and accordingly corrected at that time by moving the tool an incremental amount as required to correct the error. This approach is preferable to that of waiting until the end of a pass, especially when the flesh cutter operates near the seed. This approach also applies to the paring tool when it is not used as a follower and as a sensor.

In FIGS. 35 and 36, the types of signals (0, 1, 2, 3 and 4) are shown inside a small circle. Numbers 6, 7 and 8 (shown inside small squares) refer to command and feedback lines which are partly omitted for diagram simplification purpose. The operation and control of the vacuum system is not shown because it is not an essential part of the control system, but only an adjunct to the basic apparatus, and is simply referred to as conveyor system. Detail operational steps such as the locking and/or unlocking of the turret are also omitted, as being well known in the art. The sequential timing of the basic operations of all main components during a full operational cycle is diagrammatically shown in FIG. 3, where the displacement or action of a component is only indicated by an "on" or "off" position. The diagrams are interrupted between 4 and time T to indicate that the pulp removing operation is of variable duration. The time periods available to the CPU and its computer to receive, process and/or generate signals and/or issue command signals are indicated by area shading and appropriate callouts.

It was earlier indicated that the prongs rotate in inverse directions when they engage the avocado. This is to minimize the side forces exerted on the holding pins when the the prongs contact the seed. However, one prong usually travels longer than the other, that which is located near the small end of the avocado. A safe approach to use is to have a fifth type of signal generated by the actuating mechanism of that prong which indicates when the threaded conical point 156 (FIG. 15) of that prong makes contact with the seed. This is indicated by an increase of driving force and torque of lesser value than that which was earlier indicated for the initiation of the second signal of the second type (contact of the prong cutting edges with the seed). This prong then stops rotating until a similar intermediate signal is received by the CPU from the other prong sensing system. At that time, the rotation of the stopped prong can resume. This refinement in the prong operation and control is not reflected in the table and/or the diagrams of FIGS. 3, 35 and/or 36.

The skin and pulp removed by the trimming flanges are centrifuged by the spinning flanges into non-rotating collectors such as 160 (FIG. 15) moving with the flanges and connected to the waste evacuation system. This collecting system, being almost identical to 160, is not shown. The pulp left adhering to the external surfaces of the prongs after the pulp removing operation is pushed out by the trimming flanges and mixed with the waste evacuated by the flanges. In FIG. 31, this waste is shown as being evacuated from collectors 160 to evacuated storage container 202 connected to vacuum pump 200.

In the figures and in the disclosure, the avocado is depicted in a horizontal position. Because of the avocado softness, it may be desirable to position the avocado being processed vertically so that its weight rests on its larger hemispherical end when it is handled by the conical structures. Generally, the smaller end of the avocado either softens first and faster or seems to, at least to the touch, because of its smaller radius. It seems preferable to minimize the amount of effort exerted onto that end by the cones during the centering operation. The various component operations remain unchanged, and only a few minimal design changes will be required. The operation most affected is the free fall of the seed. This can be easily handled by adding an additional mechanism equipped with a suction cup which can then hold the seed while it is moved out of the way.

It was earlier mentioned that the avocados to be processed mechanically are selected according to shape, before they have reached any degree of softness. At this juncture, such selection can be automatically and mechanically performed by two conical structures operating as previously described, but also capable of spinning the avocado, so that a sensor operating similarly to that which is described herein can determine the degree of excentricity of the avocado. All avocados displaying a degree of excentricity exceeding a specified limit can be rejected as deemed unfit for mechanical defleshing. During the ripening period, the avocados do not change their shapes. In addition, displacement sensors located on the actuating mechanisms of the conical structures can determine the length of the avocado being sorted out so that avocados of a given variety can be eliminated if and when deemed oversized or undersized. Utilizing such a mechanical and automatic selection of avocados will insure that all avocados feed by the feeding station to the processing station are shaped and sized according to standards compatible with the requirements of the automatic processing system described and discussed herein.

A second alternate embodiment of the method and apparatus of the present invention is based on the use of a robot-like arm cooperating with the turret arrangement of FIG. 32, whereby the turret base structure is free to slide in all directions, on a table positioned horizontally, and attached to the one end of the robot arm. The table fixed vertical location is such that the center point of the cutting edges of the paring tool and/or of the flesh cutter are constantly kept in the horizontal plane passing by the avocado axis of rotation. The weights of both the turret assembly and part of the robot arm maintain the turret base on the table surface and are supported by the table.

At its other end, the robot arm is articulated onto a fixed vertical shaft mounted to the table. The robot arm is actuated so that it can oscillate around the shaft a total angle $\Omega$. The length $\Delta$ of the arm is variable and determined by the travel of an actuator therein driving the arm end holding the turret either closer or farther from the vertical shaft, according to the location required by either tool, at a given time. Each combination of values specified for both $\Omega$ and $\Delta$ establishes a determined location of the turret by means of a system of polar coordinates. As earlier mentioned, each turret position establishes an exact position of the paring tool or of the flesh cutter, when in an engaged position, with respect to the avocado axis of rotation. The robot arm, the table, the vertical shaft and the two actuating mechanisms of the arm (for angular and linear displacements) replace the two set of keyways 210 and 212, driving screws 214 and 218, and their actuating motors.

The location of any point on the avocado contour, in the plane where the center points of the cutting edges of the paring tool and the flesh cutter move, and in which the avocado centerline is located, is perfectly defined by a set of values such as $\Omega^*$ and $\Delta^*$. These values are calculated by the CPU computer from the signal data received by the sensors. If the paring tool does not act as sensor, a sensor is also mounted on the turret which then is constructed to assume three angular positions, instead of two. $\Omega^*$ and $\Delta^*$ are established by the displacements of either the sensor and/or the paring tool acting also as sensor, as the case may be. All the other processing steps and/or components and mechanisms, and their operations, remain unchanged. Essentially, an angular actuator and a linear actuator, and sensing systems detecting the positions thereof, are then used instead of two step motors and their associated driving screw-nut mechanisms. $\Omega^*$ and $\Delta^*$ play the same role as $X_i$ and $Y_i$ did for the preferred embodiment.

In the preceding text, two main directions are used as references: (1) the centerline of the avocado, also called longitudinal axis, axis of rotation and/or virtual centerline, in the Y direction of the ordinate of the system of coordinates used; and (2) the radial, lateral and/or transversal direction in the X direction of the abscissa of the system of coordinates used. Radial for instance, seems more appropriate to qualify the displacement of the holding pins which move in a transversal plane and around the avocado. Also the avocado has an axis of rotation when it rotates, but only a quasi centerline or axis of quasi symmetry until then. The tools move laterally with respect to any longitudinal direction. Such distinctions will be clear enough to readers familiar with the art, and appear more proper.

The seeds are dropped into a container. Actually, for practical reasons, they may be first dropped into a chute which guides them, propelled by gravity, into such container. The skin collecting belt is actuated by means well known in the art, the motion of which is synchronized and coordinated with that of the other components and parts of the apparatus.

Those motors that actuate either the incremental rotation of the avocado or the incremental advance of the tools, as the case may be, can be step electric motors. Such motors can be programmed to turn only a few degrees per step, and are very accurate, though slow. In the case of the preferred embodiment, the avocado rotation is referred to as spinning. In this mode of operation, the avocado rotational movement can be fast, because the go-and-stop steps of incremental angular advances are not needed. The spinning angular velocity is only limited by the capability of the pulp to withstand the tensile hoop stresses generated by the centrifugal forces developed by the spinning action.

It is thought that the method and apparatus for processing avocados of the present invention and many of its attendant advantages will be understood from the foregoing description and discussion and that it will be apparent that various changes may be made in the form, construction and arrangement of the parts thereof without departing from the spirit and scope of the invention or sacrificing any and/or all of its material advantages, the form hereinbefore described being merely preferred or examplary embodiments thereof.

Having thus described my invention, I now claim:

1. A method of removing the pulp of a stemmed, ripe, whole avocado comprising the steps of:

supporting the avocado for motion in one general direction along a travel path from a feeding station to an operating station;

positioning the avocado in said operating station so as to orient the avocado general axis of symmetry substantially in line with an axis of rotation around which the avocado will be caused to rotate during subsequent steps of the operation;

engaging a plurality of pins in the avocado so as to contact the avocado seed through firstly the skin and then the pulp;

pushing toward one another two shaped prongs rotating in opposite directions about the avocado axis into the avocado until the prong tips engage the seed along its axis of symmetry;

retracting the pins;

spinning unidirectionally the assembly of prongs and avocado;

advancing a paring tool toward the spinning avocado;

causing the paring tool to follow the contour of the avocado from one prong to the other, thereby removing the skin;

retracting the paring tool;

advancing a flesh cutter toward the avocado;

causing the flesh cutter to remove a layer of pulp along and around the avocado surface, the flesh cutter being actuated for motion to-and-fro between the prongs until substantially all of the pulp is removed;

retracting the flesh cutter;

stopping the rotation of the prongs;

pushing a plurality of pointed pads against the seed;

rotating the prongs, each one in a direction reverse from that which it followed during the engagement step, whereby both prongs are caused to disengage and free the seed simultaneously;

fully retracting the prongs;

retracting the holding pads; and letting the seed freely fall into a collecting chute.

2. The method as claimed in claim 1 in which:
the pared skin falls freely into a collecting belt;
pulp is removed by the prongs and is ducted and removed through a channel located inside each prong; and
the pulp being pared falls freely into a collecting funnel.

3. The method as claimed in claim 1 in which the positioning of the avocado includes the further steps of:
positioning two open conically shaped hollow structures having a common axis of symmetry coinciding with the axis of rotation of the prongs on either end of the avocado, the openings of the two conical surfaces facing said avocado;
advancing the conical structures toward the avocado until a firm contact is established between the avocado skin and the internal surfaces of the structures, whereby the avocado is forced to align its centerline with the axes of symmetry of the conical structures;
holding the thus oriented avocado in that position, while a sensor determines the longitudinal location of the avocado maximum transversal cross-section;
axially positioning the pins until the plane in which they are located coincides with the plane in which the avocado exhibits its maximum transversal cross-section;
radially advancing the pins until the avocado seed is engaged; and
retracting the conical structures.

4. The method as claimed in claim 3 in which the amount of displacement of each pin at the point of engagement with the seed is sensed and generates a first type of signals, the signals being sent to a central processing unit for storage and handling.

5. The method as claimed in claim 4 in which the amount of displacement of each prong at the time it is stopped by its engagement with the seed is sensed and generates a second type of signals, said signals being sent to a central processing unit for storage and handling.

6. The method as claimed in claim 5 in which the first type of signals and the second type of signals are processed by the central processing unit including the steps of:
calculating the maximum diameter of the seed;
calculating the length of the seed;
determining the location of the external surface of the seed by comparing the data above calculated with data stored in a memory bank of the central processing unit regarding the shapes of seeds of typical kinds of avocados to be processed;
establishing from the results of the above described comparison a limit beyond which the tip of the flesh cutter will not be allowed to travel, said limit consisting of a set of coordinates relating locations along two directions in which a jig having actuation means and on which the flesh cutter is mounted is allowed to reach, but not to go beyond;
positioning displacement stops on the actuation means of the jig so as to prevent the tip of the flesh cutter from reaching the external surface of the seed and a thin skin thereon;
causing any further advancing motion of the flesh cutter toward the seed to stop immediately at the time the displacement limits and stops established by the central processing unit have all been reached during a full travel of the flesh cutter from one prong to another; and
stopping the rotation of the prongs at said time.

7. The method as claimed in claim 2 in which the collected pared pulp is dropped in a container for temporary storage until further handling is required by the type of processing planned.

8. The method as claimed in claim 2 in which the collected pared skins and the freed seeds are conveyed into a storage container for disposal at a later time.

9. The method as claimed in claim 6 in which the orientation of both the paring tool and the flesh cutter, and the maximum thickness of the layer removed therewith, are automatically set for any position of either cutting means during each and every one of their travels to-and-fro from one prong to the other.

10. The method as claimed in claim 2 in which the pulp removed by and through the prongs is collected by a guarding structure and then evacuated by conveying means to a storage container for future disposal as needed.

11. The method as claimed in claim 9 in which a control system regulates and synchronizes the removals of the skin and of the pulp, and the freeing of the seed, so as to minimize the total duration of the various sequenced operations for any avocado and to insure that the positioning of the next avocado to be operated on immediately follows the freeing of the seed of the preceding avocado.

12. The method as claimed in claim 11 in which two oppositely located trimming means are provided for sectionning off a portion of each one of the two avocado ends up to locations along the avocado axis where the diameter of the outer surface of the avocado is slightly larger than that of the prongs, whereby the positions of said locations relatively to the location of the avocado maximum cross-section are detected and used to generate a third type of signals, said signals being sent to a central processing unit for storage and handling.

13. The method as claimed in claim 12 in which the central processing unit handles and processes the three types of signals to determine the approximate contours of the cross-sections taken along a longitudinal plane of symmetry of both the seed and the whole avocado, thereby establishing both the internal and external contours of the pulp to be cut, enabling the central processing unit to determine an optimum cutting schedule of the avocado to be cut so as to minimize the pulp removing duration, said cutting schedule being then used by the control system to direct the radial and lateral movements, and coordination thereof, of the actuation means of the jig supporting the flesh cutter.

14. The method as claimed in claim 13 in which the paring off of the avocado external skin and the cutting of the pulp are accomplished in a manner such that; (1) a minimum amount of pulp is wasted, and (2) enough pulp is left around the seed at the end of the flesh cutting step to insure that no portion of the skin surrounding the seed is removed with the pulp, but is all disposed of with the seed.

15. The method as claimed in claim 1 in which the pulp removed by the flesh cutter is sucked into an evacuating duct by vacuum means as the pulp is being cut off the avocado.

16. The method as claimed in claim 2 in which the pulp removed by the prongs is sucked into evacuating channels by vacuum means as the prongs are being pushed inside the avocado.

17. The method as claimed in claim 1 in which the spinning of the prongs and avocado assembly is performed by a sequence of angular increments, whereby the assembly stops between each incremental increase of the rotational angle long enough to enable both the paring tool and the flesh cutter to travel from one end of the avocado to the other end, back and forth, and comprising the further steps of:
  causing the paring tool to continue its back and forth movement until the avocado has completed a complete rotation, thereby removing all of the skin; and
  causing the flesh cutter to continue its back and forth movement during several full rotations of the avocado until most of the avocado pulp has been removed, whereby the flesh cutter is made to advance toward the seed a scheduled distance increment each and every time the avocado has completed a full rotation, thereby longitudinally removing a slice of avocado pulp during each one of the back and forth travels of the flesh cutter.

18. The method claimed in claim 16 in which the travel displacements of both the paring tool and the flesh cutter are determined within a set of coordinates which are orthogonal, one being parallel to the axis of rotation of the avocado and the other being perpendicular to said axis, the origin of said coordinates being located on a point situated outside the largest external contour of the maximum size avocado to be processed and on the axis of rotation of such said avocado, and said orthogonal coordinates being contained in a plane passing through the avocado axis of rotation.

19. The method claimed in claim 16 in which the travel displacements of both the paring tool and the flesh cutter are determined by means of a set of polar coordinates, the origin of which is located at a fixed distance from the avocado axis of rotation and outside the external contour of the maximum size avocado to be processed, the plane containing said polar coordinates being horizontal and passing through the avocado axis of rotation.

20. A method of separating the pulp of a whole avocado from the skin and seed thereof, comprising the steps of:
  supporting the avocado for rotation substantially about a predetermined axis of symmetry thereof;
  laterally engaging the seeds of the avocado through the skin and pulp thereof generally transverse to the axis of symmetry to thereby hold the seed stationary against rotation about said axis of symmetry;
  piercing and rigidly engaging the seed of the avocado through the skin and pulp thereof along the axis of symmetry while the seed is prevented from rotating about said axis of symmetry;
  disengaging the seed from transverse holding;
  causing the avocado to rotate about the axis of symmetry by rotating the seed about the axis of symmetry;
  removing the skin of the avocado without removing a substantial portion of the pulp by advancing a paring tool parallel to the axis of symmetry so that it follows an outer contour of the avocado and peels away the skin;
  removing the pulp from the seed with a cutter that engages the peeled avocado to a depth which sets the thickness of pulp layer to be removed and that moves parallel to the axis of symmetry; and
  disengaging the seed from rigid engagement along its axis of symmetry.

21. The method as claimed in claim 20 and comprising the further steps of:
  continuously rotating the avocado while the cutter moves from one end of the avocado to the other parallel to the avocado axis of symmetry;
  causing the avocado rotation to stop when a pulp layer has been removed and further engaging the cutter for a subsequent cutting pass while reversing the cutter motion direction; and
  repeating the steps above identified until substantially all of the pulp has been removed.

22. The method as claimed in claim 20 and comprising the further steps of:
  moving the cutter parallel to the axis of symmetry while the avocado is prevented from rotating;
  rotating the avocado a predetermined fraction of a revolution after the cutter has reached one end of the avocado;
  reversing the cutter motion direction and moving said cutter parallel to the axis of symmetry while the avocado is prevented from rotating until said cutter reaches the other end of the avocado; and
  repeating the steps above identified until substantially all of the pulp has been removed.

23. The method as claimed in claim 20 and comprising the further steps of:
- engaging pointed pads transversally to hold the depulped seed for holding said seed while it is being disengaged; and
- retracting said pads upon seed disengagement.

24. The method as claimed in claim 20 and comprising the further steps of:
- determining the seed dimensions during the seed engagement operational steps in the axial and transversal directions;
- determining the avocado contour during the skin paring operational steps;
- determining therefrom the shape and dimensions of the pulp bulk to be removed with the cutter; and
- establishing therefrom the thickness of each pulp layer to be removed and the number of passes to be made by the cutter so as to minimize the pulp removal duration for each avocado.

25. The method as claimed in claim 20 and comprising the further steps of:
- causing the avocado axis of symmetry to be substantially aligned with an axis of rotation about which said avocado is to rotate subsequently;
- advancing simultaneously two conically-shaped structures toward both ends of the avocado, the centerlines of the internal surfaces thereof coinciding with said axis of rotation, so as to better align the avocado axis of symmetry with said structure centerlines; and
- holding the thus axially oriented avocado in a fixed position while said avocado is transversally engaged.

26. The method as claimed in claim 24 and comprising the further steps of:
- determining the thickness of the residual pulp layer to be left adhering to the seed after the last cutter pass so as to insure that the thin skin enveloping the seed is undisturbed during said cutter last pass; and
- causing the seed and residual pulp adhering thereto to be disposed of as one integral body.

27. The method as claimed in claim 20 and comprising the further steps of:
- trimming the two partially quasi-hemispherical ends of the avocado prior to the skin paring operational step so as to facilitate the operations of the paring tool and of the cutter near the avocado ends;
- whereby insuring that no residual skin is left at the end of the skin paring operation and that the cutter operation remains unhindered by the longitudinal engagement of the seed.

* * * * *